(12) United States Patent
Park et al.

(10) Patent No.: US 10,816,876 B2
(45) Date of Patent: *Oct. 27, 2020

(54) CAMERA MODULE, LENS MODULE, AND STOP MODULE

(71) Applicant: Samsung Electro-Mechanics Co., Ltd., Suwon-si (KR)

(72) Inventors: Chuel Jin Park, Suwon-si (KR); Dae Sik Kim, Suwon-si (KR); Sang Hyun Ji, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,013

(22) Filed: Sep. 11, 2019

(65) Prior Publication Data

US 2020/0004110 A1 Jan. 2, 2020

Related U.S. Application Data

(63) Continuation of application No. 16/115,619, filed on Aug. 29, 2018, now Pat. No. 10,444,599, which is a
(Continued)

(30) Foreign Application Priority Data

Mar. 31, 2017 (KR) .................. 10-2017-0041956

(51) Int. Cl.
*G03B 9/02* (2006.01)
*H04N 5/238* (2006.01)
(Continued)

(52) U.S. Cl.
CPC ............ *G03B 9/02* (2013.01); *H04N 5/2252* (2013.01); *H04N 5/2254* (2013.01);
(Continued)

(58) Field of Classification Search
CPC .. H04N 5/2252; H04N 5/2253; H04N 5/2254; H04N 5/2257; H04N 5/238;
(Continued)

(56) References Cited

U.S. PATENT DOCUMENTS 5,099,334 A 3/1992 Ogata et al.
7,396,169 B2 7/2008 Naganuma
(Continued)

FOREIGN PATENT DOCUMENTS

CN 203465460 U 3/2014
JP 2007-079390 A 3/2007
(Continued)

OTHER PUBLICATIONS

Korean Office Action dated Oct. 22, 2018 in corresponding Korean Patent Application No. 10-2017-0041956 (6 pages in English and 5 pages in Korean).
(Continued)

*Primary Examiner* — Ngoc Yen T Vu
(74) *Attorney, Agent, or Firm* — NSIP Law (57) ABSTRACT

A camera module includes a housing to accommodate a lens module, a stop module coupled to the lens module and configured to selectively change an amount of light incident to the lens module, and a coil portion configured to drive the stop module to selectively change an amount of light incident to the lens module. The coil portion is disposed on the housing.

8 Claims, 7 Drawing Sheets

Related U.S. Application Data continuation of application No. 15/884,606, filed on Jan. 31, 2018, now Pat. No. 10,690,997.

(51) Int. Cl.
  *H04N 5/225* (2006.01)
  *G03B 9/14* (2006.01)
  *H02K 33/16* (2006.01)

(52) U.S. Cl.
  CPC .............. *H04N 5/238* (2013.01); *G03B 9/14* (2013.01); *G03B 2205/0069* (2013.01); *H02K 33/16* (2013.01)

(58) Field of Classification Search
  CPC .. G02B 27/646; H04M 1/026; H04M 1/0264; G03B 9/02; G03B 9/04; G03B 9/06
  See application file for complete search history.

(56) References Cited

U.S. PATENT DOCUMENTS

| | | | |
|---|---|---|---|
| 7,708,479 B2 | 5/2010 | Watanabe et al. | |
| 7,907,839 B2 | 3/2011 | Shin et al. | |
| 7,942,592 B2 | 5/2011 | Sawanobori et al. | |
| 8,337,102 B2* | 12/2012 | Lim | G03B 9/08 |
| | | | 396/468 |
| 8,717,493 B2 | 5/2014 | Han | |
| 10,095,085 B2 | 10/2018 | Kim et al. | |
| 10,295,781 B2 | 5/2019 | Park et al. | |
| 2005/0058444 A1 | 3/2005 | Watanabe et al. | |
| 2005/0146637 A1* | 7/2005 | Kawauchi | G03B 9/24 |
| | | | 348/363 |
| 2007/0110433 A1* | 5/2007 | Masahiko | G03B 9/14 |
| | | | 396/469 |
| 2008/0212959 A1 | 9/2008 | Shin et al. | |
| 2011/0206365 A1 | 8/2011 | Yoo et al. | |
| 2018/0341166 A1 | 11/2018 | Imai et al. | |

FOREIGN PATENT DOCUMENTS

| | | |
|---|---|---|
| JP | 2008-250190 A | 10/2008 |
| JP | 4317411 B2 | 8/2009 |
| KR | 10-0736486 B1 | 7/2007 |
| KR | 10-2008-0082839 A | 9/2008 |
| KR | 10-2011-0078485 A | 7/2011 |
| WO | WO 2017/030048 A1 | 2/2017 |

OTHER PUBLICATIONS

Korean Office Action dated Apr. 8, 2019 in corresponding Korean Patent Application No. 10-2017-0041956 (6 pages in English and 5 pages in Korean).

United States Office Action dated Jun. 13, 2019 in related application, U.S. Appl. No. 15/884,606 (13 pages in English).

Chinese Office Action dated Feb. 3, 2020 in counterpart Chinese Patent Application No. 201810295944.4 (26 pages in English and 16 pages in Chinese).

\* cited by examiner

CAMERA MODULE, LENS MODULE, AND STOP MODULE

CROSS-REFERENCE TO RELATED APPLICATIONS

This application is a Continuation Application of U.S. patent application Ser. No. 16/115,619 filed on Aug. 29, 2018, now U.S. Pat. No. 10,444,599 issued on Oct. 15, 2019, which is a Continuation Application of U.S. patent application Ser. No. 15/884,606 filed on Jan. 31, 2018, which claims the benefit under 35 USC 119(a) of Korean Patent Application No. 10-2017-0041956 filed on Mar. 31, 2017, in the Korean Intellectual Property Office, the entire disclosures of which are incorporated herein by reference for all purposes.

BACKGROUND

1. Field

This application relates to a camera module.

2. Description of Related Art

Recently, camera modules have become standard in portable electronic devices such as tablet personal computers, laptop computers, and the like, as well as in smartphones.

A general digital camera includes a mechanical stop to change an amount of incident light therein, depending on an image capturing environment, but it may be difficult for a camera module used in a small product such as a portable electronic device to separately include a stop.

As an example, the camera module weight may be increased due to the addition of components for driving the stop, such that an autofocusing function may be deteriorated.

In addition, when a circuit connection portion for driving the stop is provided in the stop itself, tension is generated in the circuit connection portion due to vertical movement of lenses at the time of performing autofocusing, such that loss of performance or a problem may occur in the autofocusing function.

The above information disclosed in this Background section is only for enhancement of understanding of the background of the disclosure and therefore it may contain information that does not form any part of the prior art nor what the prior art may suggest to a person of ordinary skill in the art.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect a camera module includes a housing configured to accommodate a lens module therein, a stop module coupled to the lens module and configured to selectively change an amount of light incident to the lens module, and a first coil portion configured to drive the stop module to selectively change an amount of light incident to the lens module, wherein the first coil portion is disposed on the housing.

The stop module may include incident holes having different sizes from each other, and at least one of the incident holes being rotatably provided.

The stop module may include a first stop having a first incident hole; and a second stop disposed to be rotatable with respect to the first stop and having a second incident hole. A diameter of the first incident hole and a diameter of the second incident hole may be different from each other.

The stop module may include a plate, a magnet portion disposed on the plate, a first stop coupled to the plate, and a second stop disposed on the plate and configured to be rotatable with respect to the first stop. The second stop may be coupled to the magnet portion and rotated as a result of movement of the magnet portion. The magnet portion may include a first protrusion portion extending through the first stop and the second stop. The first stop may include a guide hole through which the first protrusion portion passes, and the guide hole may be elongated in a movement direction of the magnet portion. The plate may include a second protrusion portion, and the second stop may be rotatable around the second protrusion portion. The magnet portion may include a magnet disposed to face the first coil portion; and a magnet housing, wherein the magnet may be coupled to the magnet housing.

The lens module may include an optical axis and be movable with the stop module in an optical axis direction.

The camera module may further include a focusing portion comprising a magnet disposed on a surface of the lens module and a second coil portion disposed on the housing to face the magnet.

In another general aspect, a camera module includes a housing configured to accommodate a lens module therein; a stop module coupled to the lens module to be movable with the lens module in an optical axis direction; and a stop driving portion. The stop driving portion includes a magnet portion movably disposed on the stop module; and a first coil portion disposed on the housing to face the magnet portion. The stop module includes incident holes of different sizes, and at least one of the incident holes is rotatably disposed.

The camera module may further include a focusing portion including a magnet disposed on a surface of the lens module; and a second coil portion disposed on the housing to face the magnet. The stop driving portion and the focusing portion may be positioned opposite each other in relation to the lens module.

In another general aspect, a camera module includes a stop module. The stop module includes a plate having a through opening to pass light therethrough, a magnetic portion movably disposed on the plate, a first stop having a first incident hole and coupled to the plate; and a second stop having a second incident hole, the second stop disposed on the plate and configured to be rotatable with respect to the first stop to selectively change an amount of incident light passing therethrough, wherein the second stop is coupled to the magnetic portion.

The camera module may further include a coil portion spaced apart from the magnetic portion, the coil portion configured to move the magnetic portion relative to the plate to selectively change the amount of light passing through the through opening. The plate may be movable relative to the coil portion. The camera module may further include a printed circuit board connected to the coil portion, wherein the plate may be movable relative to the coil portion and the printed circuit board. The camera module, may further include a housing. The coil portion may be disposed on the housing and the stop module may be configured to move in the housing in an optical axis direction independently from the coil portion.

The second stop may be coupled to the magnet portion and rotated as a result of movement of the magnet portion.

The magnet portion include a first protrusion portion extending through the first stop and the second stop. The first stop may include a guide hole through which the first protrusion portion passes, and the guide hole maybe elongated in a movement direction of the magnet portion. The plate may include a second protrusion portion, and the second stop may be rotatable around the second protrusion portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

It will be understood that when an element or layer is referred to as being "on", "connected to", or "coupled to" another element or layer, it can be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present.

An aspect of this application may provide a camera module capable of selectively changing an amount of light incident through a stop module and preventing deterioration of performance of an autofocusing function even though the stop module is mounted in the camera module.

An aspect of this application may also provide a camera module in which a weight of a stop module may be reduced.

An example of a camera module described in this application, may be mounted in a portable electronic device such as a mobile communications terminal, a smartphone, a tablet personal computer, a laptop computer, wearable glasses, or the like.

Figure 1:
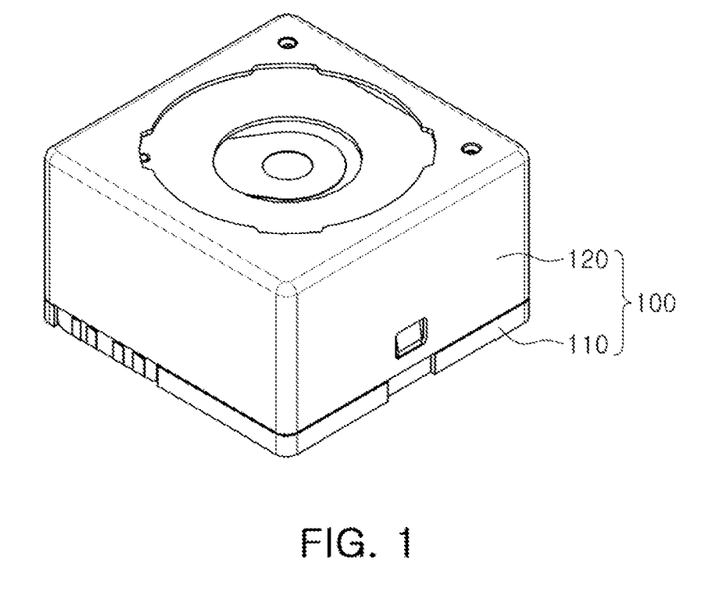
FIG. 1 is a perspective view illustrating an example of a camera module.
Figure 2:
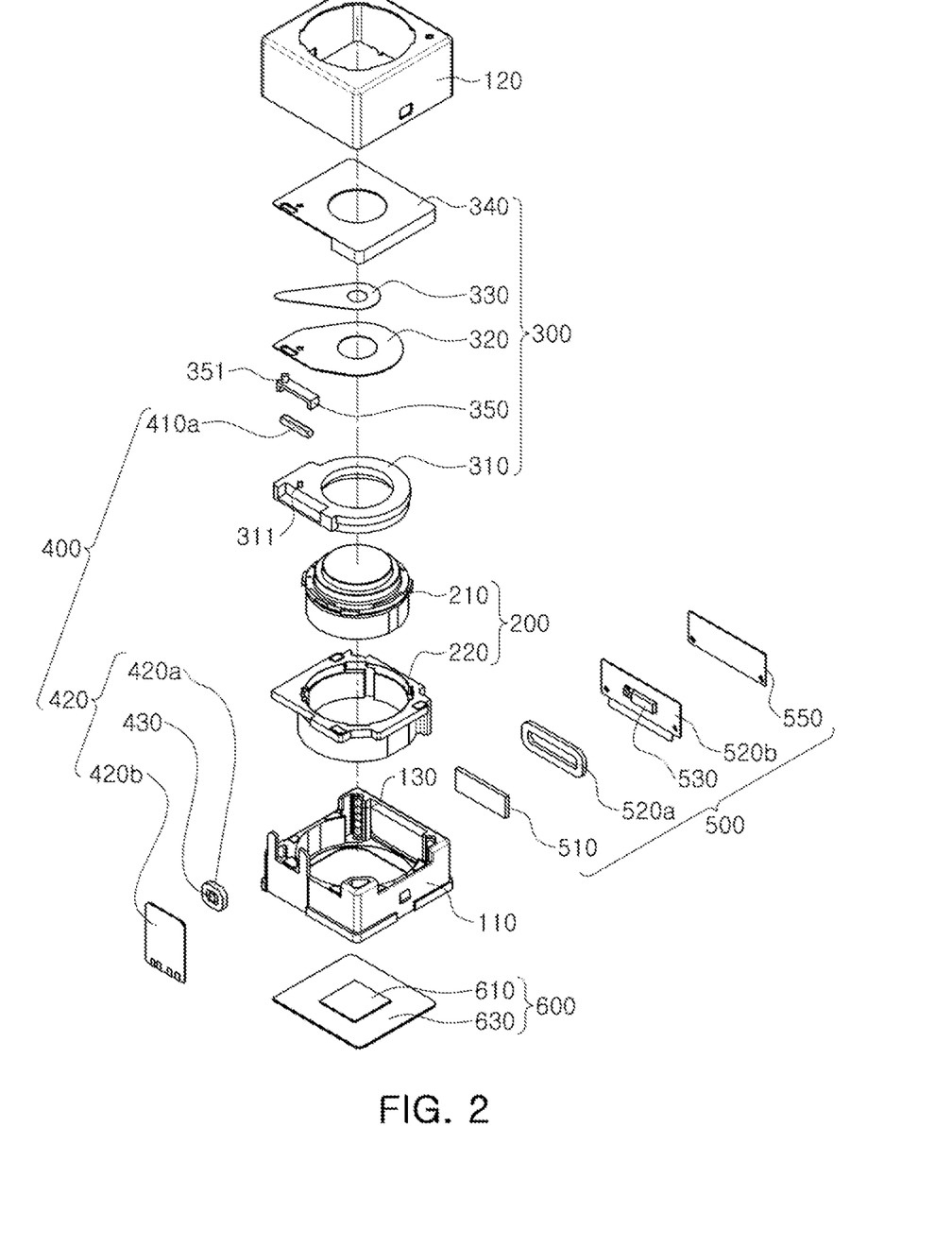
FIG. 2 is an exploded perspective view illustrating the camera module of FIG. 1.

FIG. 1 is a perspective view illustrating an example of a camera module. FIG. 2 is an exploded perspective view illustrating the camera module of FIG. 1.

Referring to FIGS. 1 and 2, the camera module 100 includes a lens module 200, a focusing portion 500, a stop module 300, a stop driving portion 400, an image sensor module 600, a housing 110, and a case 120.

The lens module 200 includes a lens barrel 210 including a plurality of lenses to capture an image of a subject and a carrier 220 coupled to the lens barrel 210. The plurality of lenses are disposed in the lens barrel 210 along an optical axis.

The focusing portion 500 may be a device to move the lens module 200.

As an example, the focusing portion 500 may move the lens module 200 in the optical axis direction to perform focusing.

The focusing portion 500 may include a magnet 510 and a coil portion 520 to generate a driving force in the optical axis direction.

The magnet 510 may be mounted on the lens module 200. As an example, the magnet 510 is mounted on a surface of the carrier 220, as another example, the magnet 510 is embedded in a wall of the carrier 220.

The coil portion 520a, 520b may be mounted on the housing 110. As an example, the coil portion 520a, 520b includes a coil 520a disposed to face the magnet 510 and a substrate 520b on which the coil 520a is disposed, and the substrate 520b is disposed on the housing 110.

The magnet 510 may be a moving member mounted on the carrier 220 to thus be moved together with the carrier 220 in the optical axis direction, and the coil 520a may be a fixed member disposed on the substrate 520b.

In this example, when power is applied to the coil 520a, the carrier 220 is moved in the optical axis direction by electromagnetic interaction between the magnet 510 and the coil 520a.

Since the lens barrel 210 is mounted to the carrier 220, the lens barrel 210 is also moved together with the carrier 220 in the optical axis direction by movement of the carrier 220.

Rolling members 130 may be disposed between the carrier 220 and the housing 110 to control friction between the carrier 220 and the housing 110 when the carrier is moved. The rolling members 130 may have a ball form, such as ball bearings, or a cylinder form, such as roller bearings.

The rolling members 130 may be disposed on both sides of the magnet 510.

A yoke 550 may be mounted on the substrate 520b. As an example, the yoke 550 is disposed to face the magnet 510 with the coil 520a interposed therebetween.

An attractive force acts in a direction perpendicular to the optical axis direction between the yoke 550 and the magnet 510.

Therefore, the rolling members 130 may be maintained in a state in which they are in contact with the carrier 220 and the housing 110 by the attractive force between the yoke 550 and the magnet 510.

In addition, the yoke 550 may serve to focus magnetic force of the magnet 510. Therefore, generation of leakage magnetic flux may be prevented.

As an example, the yoke 550 and the magnet 510 form a magnetic circuit.

In the example, a closed loop control manner of sensing and feeding back a position of the lens module 200 may be used.

A position sensor 530 may be used to perform the closed loop control. The position sensor 530 may be a hall sensor.

The position sensor 530 may be disposed inside or outside the coil 520a, and may be mounted on the substrate 520b on which the coil 520a is disposed.

In addition, the position sensor 530 may be formed integrally with a circuit element that provides a driving signal to the focusing portion 500. However, the position sensor 530 and the circuit element are not limited thereto, and may also be provided as separate components.

The lens module 200 may be accommodated in the housing 110.

As an example, the housing 110 may have a shape in which the top and the bottom are open, and the lens module 200 may be accommodated in an internal space of the housing 110.

The image sensor module 600 may be disposed on the bottom of the housing 110.

The case 120 may be coupled to the housing 110 to surround outer surfaces of the housing 110, and may serve to protect internal components of the camera module.

In addition, the case 120 may serve to shield electromagnetic waves.

As an example, the case 120 shields electromagnetic waves so that electromagnetic waves generated by the camera module do not have an influence on other electronic components in the portable electronic device.

In addition, since several electronic components as well as the camera module are generally mounted in the portable electronic device, the case 120 may shield electromagnetic waves so that electromagnetic waves generated by these other electronic components do not have an influence on the camera module.

The case 120 may be formed of a metal and thus be grounded to a ground pad provided on a printed circuit board, resulting in shielding the electromagnetic waves.

The image sensor module 600 may be a device to convert light incident thereto through the lens module 200 into an electrical signal.

As an example, the image sensor module 600 includes an image sensor 610 and a printed circuit board 630 connected to the image sensor 610, and may further include an infrared filter (not illustrated).

The infrared filter (not illustrated) may serve to remove light in an infrared region from the light incident thereto through the lens module 200.

The image sensor 610 may convert the light incident thereto through the lens module 200 into an electrical signal. As an example, the image sensor 610 is a charge coupled device (CCD) or a complementary metal oxide semiconductor (CMOS).

The electrical signal converted by the image sensor 610 may be output as an image through a display unit of the portable electronic device.

The image sensor 610 may be fixed to the printed circuit board 630, and may be electrically connected to the printed circuit board 630 by wire bonding.

The stop module 300 is a device configured to selectively change an amount of light incident to the lens module 200.

As an example, a plurality of incident holes having different sizes is provided in the stop module 300, and at least one of the plurality of incident holes is rotatably provided to change the amount of light incident to the lens module 200. The amount of light incident to the lens module 200 may be changed by the stop module 300 depending on an image capturing environment.

Figure 3:
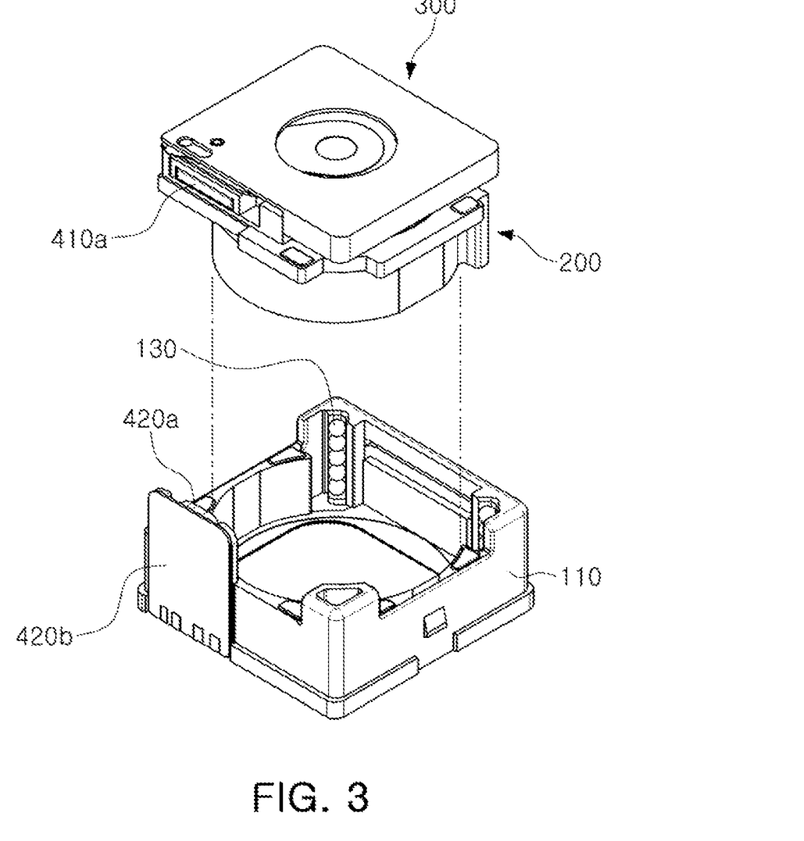
FIG. 3 is a partially exploded perspective view illustrating the camera module of FIG. 1.
Figure 4:
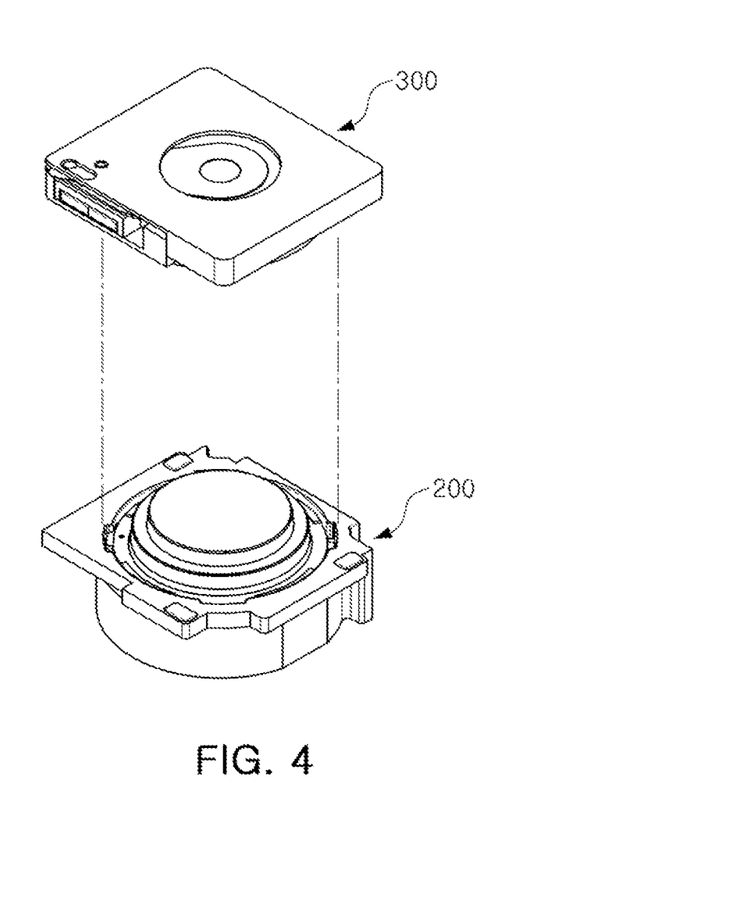
FIG. 4 is an exploded perspective view illustrating an example lens module and an example stop module of the camera module of FIG. 1.

FIG. 3 is a partially exploded perspective view illustrating the camera module of FIG. 1, and FIG. 4 is an exploded perspective view illustrating an example lens module and an example stop module of the camera module of FIG. 1.

As illustrated in FIGS. 3 and 4, the stop module 300 is coupled to the lens module 200, and is configured to selectively change the amount of light incident to the lens module 200.

Since the stop module 300 allows a relatively small amount of light to be incident to the lens module 200 in a high illumination environment and allows a relatively large amount of light to be incident to the lens module 200 in a low illumination environment, the stop module can constantly maintain image quality even in various illumination conditions.

The stop module 300 is coupled to the lens module 200 to thus be movable together with the lens module 200 in the optical axis direction.

Therefore, at the time of performing autofocusing, a distance between the lens module 200 and the stop module 300 is not changed.

Figure 5:
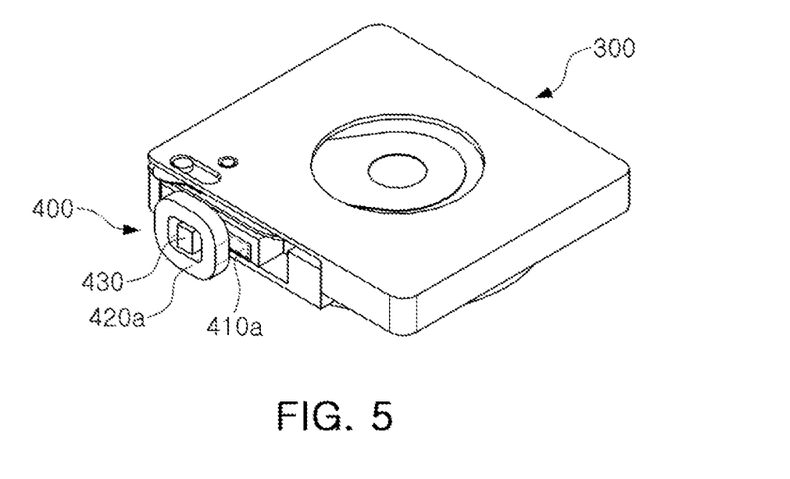
FIG. 5 is a perspective view illustrating the stop module of FIG. 4.
Figure 6:
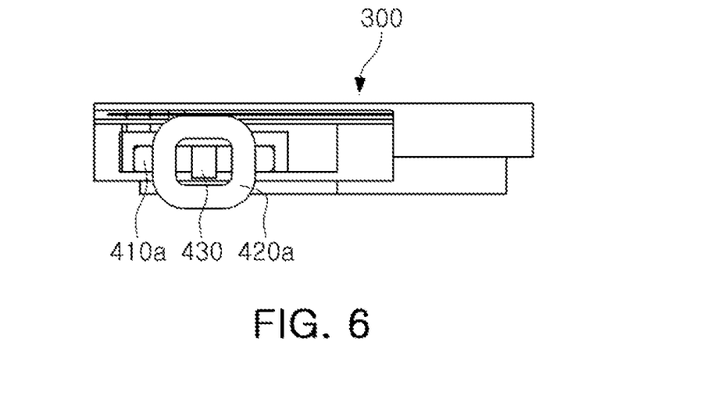
FIG. 6 is a side view illustrating the stop module of FIG. 4.
Figure 7:
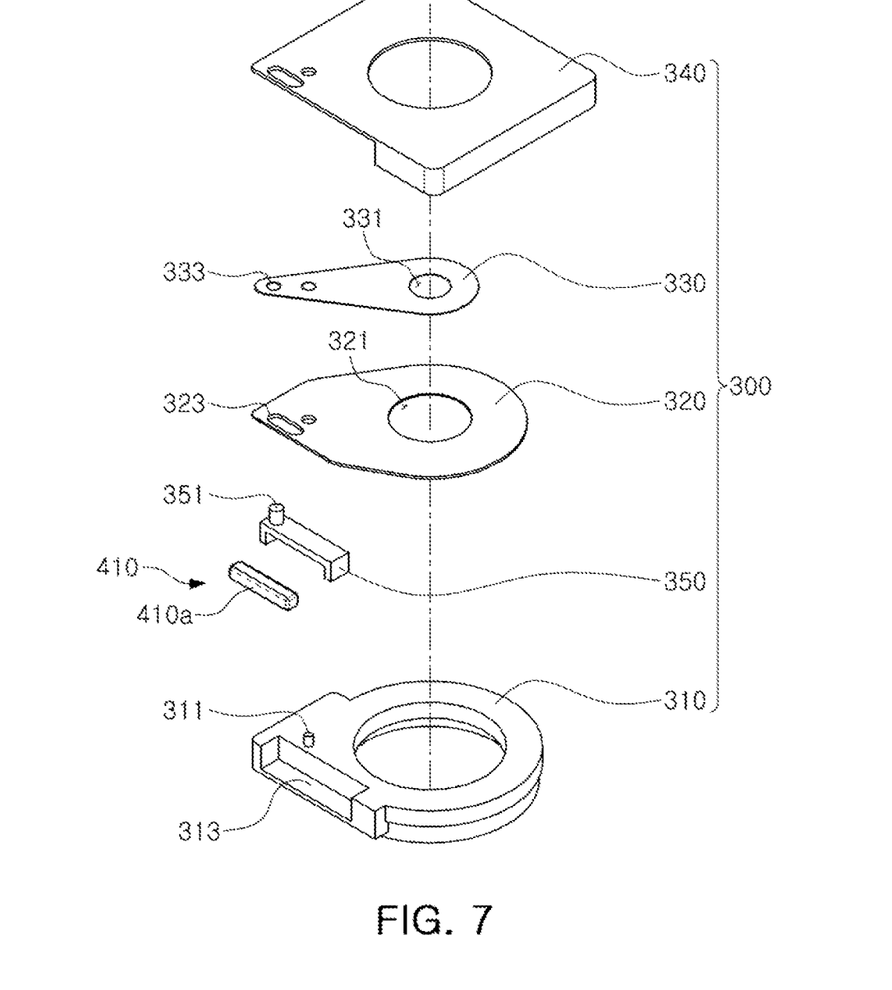
FIG. 7 is an exploded perspective view illustrating the stop module of FIG. 4.

FIG. 5 is a perspective view illustrating the stop module 300 of FIG. 4, FIG. 6 is a side view illustrating the stop module 300 of FIG. 4, and FIG. 7 is an exploded perspective view illustrating the stop module 300 of FIG. 4.

Figure 8A:
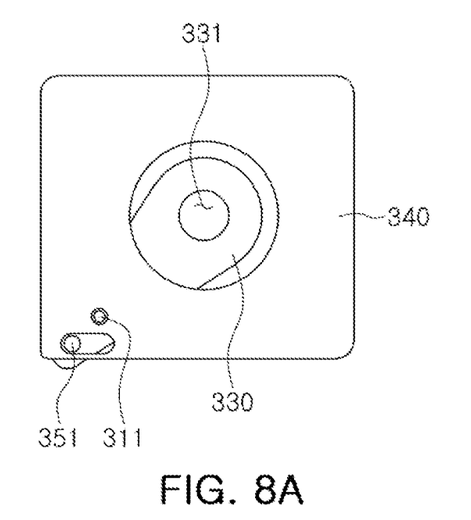
FIGS. 8A and 8B are views illustrating a form in which the stop module of FIG. 4 selectively changes an amount of incident light.
Figure 8B:
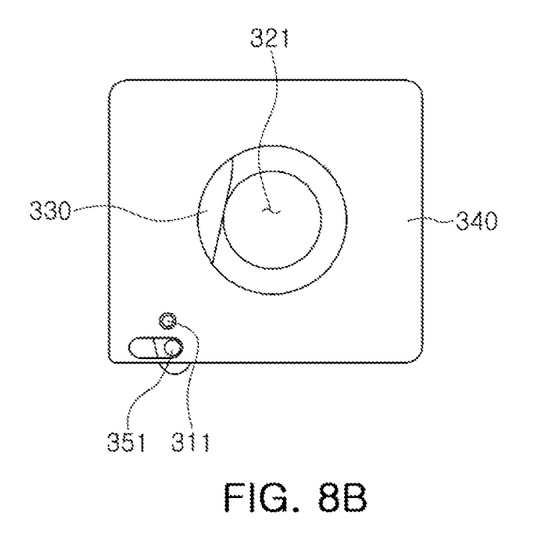

In addition, FIGS. 8A and 8B are views illustrating a form in which the stop module 300 of FIG. 4 selectively changes an amount of incident light.

First, referring to FIGS. 5 through 7, the stop module 300 includes a plate 310, a first stop 320 coupled to the plate 310, a second stop 330 disposed to be rotatable with respect to the first stop 320, and the stop driving portion 400 configured to rotate the second stop 330. In addition, the stop module 300 further includes a cover 340 to cover the plate 310, the first stop 320, and the second stop 330.

The first stop 320 includes a first incident hole 321 through which light passes, and the second stop 330 includes a second incident hole 331 through which light passes.

A diameter of the first incident hole 321 and a diameter of the second incident hole 331 are different from each other.

A case in which two incident holes having different diameters are formed in the stop module 300 is described in the present example, but this disclosure is not limited thereto. That is, the stop module 300 may have a plurality of incident holes having different sizes.

The stop driving portion 400 includes a magnet portion 410 disposed on the plate 310 to be movable along one axis and a coil portion 420 disposed on the housing 110 to face the magnet portion 410.

The coil portion 420 includes a coil 420a facing the magnet portion 410 and a substrate 420b on which the coil 420a is provided, and the substrate 420b is mounted on the housing 110. The substrate 420b may be electrically connected to the printed circuit board 630.

A closed loop control manner of sensing and feeding back a position of the second stop 330 may be used. Position sensor 430 may be used to perform the closed loop control. The position sensor 430 may be a hall sensor. The position sensor 430 may be disposed inside or outside the coil 420a, and may be mounted on the substrate 420b on which the coil 420a is disposed. In addition, the position sensor 430 may be formed integrally with a circuit element that provides a driving signal to the stop driving portion 400. However, the position sensor 430 and the circuit element are not limited thereto, and may also be provided as separate components.

Since the coil 420a that provides a driving force to the stop module 300 is disposed outside of the stop module 300, that is, on the housing 110 of the camera module 100, a weight of the stop module 300 may be reduced.

In addition, since the coil 420a that provides the driving force to the stop module 300 is disposed on the housing 110, which is a fixed member, and is electrically connected to the printed circuit board 630, even though the lens module 200 and the stop module 300 are moved at the time of performing autofocusing, the movement of the lens module 200 and the stop module 300 do not have an influence on the coil portion 420 of the stop driving portion 400.

Therefore, deterioration of an autofocusing function may be prevented.

The plate 310 is provided with a guide groove 313 in which the magnet portion 410 is disposed.

Since the guide groove 313 has a length greater than that of the magnet portion 410, the magnet portion 410 may be moved along the one axis in the guide groove 313.

The magnet portion 410 includes a magnet 410a disposed to face the coil portion 420 and a magnet housing 350 to which the magnet 410a is attached.

The magnet housing 350 is provided with a first protrusion portion 351 that penetrates through the first stop 320 and the second stop 330.

A guide hole 323 through which the first protrusion portion 351 passes is formed in the first stop 320, and may have a length in the moving direction of the magnet portion 410.

Therefore, when the magnet portion 410 is moved along the one axis, the first protrusion portion 351 is moved in the guide groove 323, and the first stop 320 may be maintained in a fixed state without being affected by the movement of the magnet portion 410.

A through-hole 333 into which the first protrusion portion 351 is fitted is formed in the second stop 330, and the first protrusion portion 351 is moved in a state in which it is fitted into the through-hole 333, and the second stop 330 may thus be moved together with the magnet portion 410.

For example, the second stop 330 is rotated as a result of the movement of the magnet portion 410.

The plate 310 is provided with a second protrusion portion 311, and the second protrusion portion 311 penetrates through the first stop 320 and the second stop 330.

The second protrusion portion 311 is disposed adjacent to the guide hole 323, and may be positioned between a distal end and a proximate end of the guide hole 323.

The second stop 330 is rotatable around the second protrusion portion 311. As an example, the second protrusion portion 311 serves as a shaft (rotation axis) of the second stop 330.

Therefore, when the magnet portion 410 is moved in the guide groove 313 of the plate 310, the second stop 330 is rotated by the movement of the magnet portion 410.

Since the diameters of the first incident hole 321 of the first stop 320 and the second incident hole 331 of the second stop 330 are different from each other, amounts of incident light passing through the first incident hole 321 and the second incident hole 331 are also different from each other for a given incident light intensity.

In an example, the diameter of the first incident hole 321 is greater than that of the second incident hole 331, and the second stop 330 is formed to have a size sufficient to cover the first incident hole 321 in a position in which the first stop 320 and the second stop 330 overlap each other.

Therefore, the light may be incident to the lens module 200 through the second incident hole 331 of the second stop 330 in the position in which the first stop 320 and the second stop 330 overlap each other.

In addition, the light may be incident to the lens module 200 through the first incident hole 331 of the first stop 320 in a state in which the second stop 330 is rotated.

Therefore, as illustrated in FIGS. 8A and 8B, in the example camera module 100, the light may be incident to the first incident hole 321 or the second incident hole 331 depending on a desired amount of incident light in an image capturing environment to thus constantly maintain image quality in various image capturing environments.

As set forth above, in the example camera module 100, the amount of incident light may be selectively changed through the stop module, loss of performance of the autofocusing function may be prevented even though the stop module is mounted in the camera module, and the weight of the stop module may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing;
    a lens module accommodated in the housing;
    a stop module coupled to the lens module, and the stop module comprising one or more stop blades; and
    a stop driver configured to drive at least one of the one or more stop blades,
    wherein the stop driver comprises a magnet for driving the at least one of the one or more stop blades,
    wherein the magnet is configured to move together with the lens module in an optical axis direction.

2. The camera module of claim 1, wherein the magnet is configured to be moved linearly.

3. The camera module of claim 2, wherein the magnet is configured to be moved linearly in a direction substantially perpendicular to the optical axis direction.

4. The camera module of claim 1, wherein the stop driver is configured to rotationally drive the at least one of the one or more stop blades.

5. The camera module of claim 4, wherein the stop driver comprises a magnet housing to which the magnet is fixed, and the at least one of the one or more stop blades is interlocked with the magnet housing.

6. The camera module of claim 1, wherein the stop driver comprises a coil provided in one surface of the housing, the one surface being parallel with the optical axis direction and the magnet disposed to be opposite to the coil.

7. A camera module, comprising:
a housing;
a lens module accommodated in the housing;
a stop module coupled to the lens module, and the stop module comprising one or more stop blades; and
a stop driver configured to drive at least one of the one or more stop blades, and the stop driver comprising a coil and a magnet,
wherein the magnet is configured to interact with the coil to move linearly in a direction substantially perpendicular to an optical axis direction, and
wherein the coil is provided in one surface of the housing, the one surface being parallel with the optical axis direction and the magnet disposed to be opposite to the coil,
wherein the magnet is configured to move together with the lens module in the optical axis direction.

8. The camera module of claim 7, wherein the at least one of the one or more stop blades is configured to rotate in conjunction with a linear movement of the magnet.

* * * * *